April 7, 1964

G. P. PATRIQUIN ETAL 3,128,115

RESIDENTIAL LOCK ASSEMBLY

Filed July 21, 1959

INVENTORS
George P. Patriquin
BY & Norman R. Adler

*J F Bareches* their ATTORNEY

April 7, 1964 G. P. PATRIQUIN ETAL 3,128,115
RESIDENTIAL LOCK ASSEMBLY
Filed July 21, 1959 8 Sheets-Sheet 3

Fig. 4

INVENTORS
George P. Patriquin
& Norman R. Adler
BY
by J. J. Basseches
their ATTORNEY April 7, 1964 G. P. PATRIQUIN ETAL 3,128,115
RESIDENTIAL LOCK ASSEMBLY
Filed July 21, 1959 8 Sheets-Sheet 4

Fig. 5

INVENTORS
George P. Patriquin
BY & Norman R. Adler
their ATTORNEY

April 7, 1964  G. P. PATRIQUIN ETAL  3,128,115
RESIDENTIAL LOCK ASSEMBLY
Filed July 21, 1959  8 Sheets-Sheet 7

INVENTORS
George P. Patriquin
& Norman R. Adler
BY
their ATTORNEY

April 7, 1964　　　G. P. PATRIQUIN ETAL　　　3,128,115
RESIDENTIAL LOCK ASSEMBLY

Filed July 21, 1959　　　　　　　　　　　　　　8 Sheets—Sheet 8

INVENTORS
George P. Patriquin
BY & Norman R. Adler their ATTORNEY

United States Patent Office 3,128,115
Patented Apr. 7, 1964

3,128,115
RESIDENTIAL LOCK ASSEMBLY
George P. Patriquin, Gardner, and Norman R. Adler, Fitchburg, Mass., assignors to Independent Lock Company, Fitchburg, Mass., a corporation of Massachusetts
Filed July 21, 1959, Ser. No. 828,530
13 Claims. (Cl. 292—336.3)

This invention relates to a lock assembly, and more specifically to a cylindrical, residential communicating lock assembly, and still more specifically, to a method and means for assembling the same.

The invention has for its object the provision of a lock assembly characterized by the features of high economy in production incident to the coordination of the individual parts which permits manual assembly without tools, jigs or special dies, substantially without special, costly bending, staking, riveting or like operations which are time-consuming and require heavy and expensive machinery.

The invention more specifically has for its object the provision of a cylindrical lock assembly characterized by the high economies which are effected in utilizing, in part, the stress resistance, yieldability and self-lubricating properties of a nylon type plastic, to permit springing interfitting parts into fastening engagement, to get adequate rigidity, and long life endurance, without the high costs of labor in finishing and machining operations to interlock the coordinated components, and to combine therewith a balancing and compensating component with respect to thermal and humidity changes, whereby close tolerance is maintained to provide for bearing surfaces, a predetermined clearance in operation to assure optimum operating conditions and acceptable workmanship in long service.

Still more particularly, it is an object of the invention to provide a cylindrical lock assembly, and assembly means therefor, which effect high economies in production by utilizing completely molded components of yieldable and self-lubricating plastics of the class of nylon resins, and Zytel nylon specifically, which, when combined with more rigid metal components, such as steel, may be assembled and held together by the self-dimensional-restoring or "memory" characteristics of the nylon plastic, Zytel, without requiring deforming operations, such as riveting, staking, peening, bending, to unite the parts into operating relationship.

Still more particularly, it is an object of the invention to provide a rosette assembly in which steel or like knob spindles are self-lubricated by the employment of nylon type bearings, and to combine therewith thermal and humidity balancing structures to assure close working tolerances over a wide range of changes in atmospheric conditions.

Still more particularly, it is an object of the invention to provide, in a cylindrical lock assembly, interengaging rose plates characterized by self-orientation of the interengaging components, thereby avoiding errors in assembly and thereby effecting economies in labor.

Still more particularly, it is an object of the invention to provide in a cylindrical lock of compact outline, novel outside knob dogging means, and combine therewith features to avoid the hazard of accidental lock-out in setting the outside knob dogging means in position.

Still further objects of the invention reside in the provision of a latch bolt casing characterized by simplicity of assembly, without special tools, punching, riveting, staking or stamping operations, in that the component parts are first preformed and then clamped into engagement fixedly by manual assembly, thereby to effect large economies in the cost of assembly equipment.

Still further objects of the invention reside in the provision of a low cost, highly efficient and durable privacy lock and method of assembly thereof, to effect economies in the production of such product.

Reference will now be made to the appended drawings, to attain these objects and such further objects as may appear herein or be hereinafter pointed out, wherein—

The construction employs three sub-assemblies:
(I) An outside knob assembly;
(II) An inside knob assembly;
(III) A latch bolt assembly.

These three assemblies are organized so that upon drilling a door D with an end boring 10 and a transverse boring 11, the installation is made by locating the latch bolt casing in the boring 10 on the edge of the door and then coupling this with the outside knob assembly I and inside knob assembly II on the opposite faces of the door, to integrate the cooperating inside knob, outside knob and latch bolt.

(I)

Figure 1:
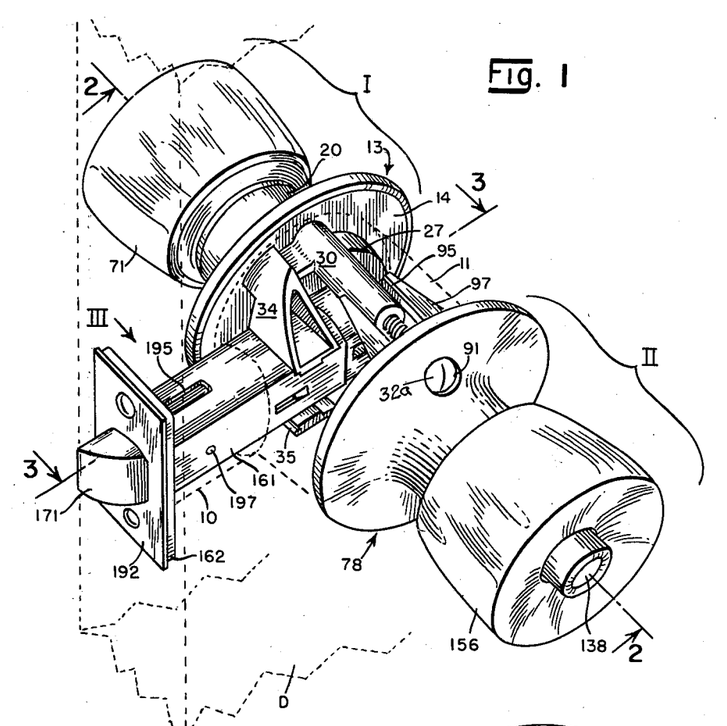
FIGURE 1 is a perspective view showing the complete lock in accordance with our invention.
Figure 2:
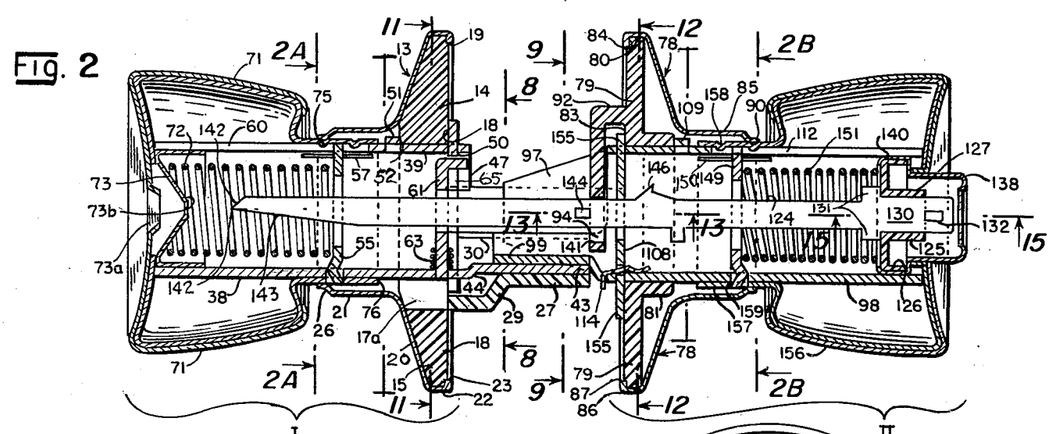
FIGURE 2 is a section on the line 2—2 of FIGURE 1.
Figures 2A, 2B:
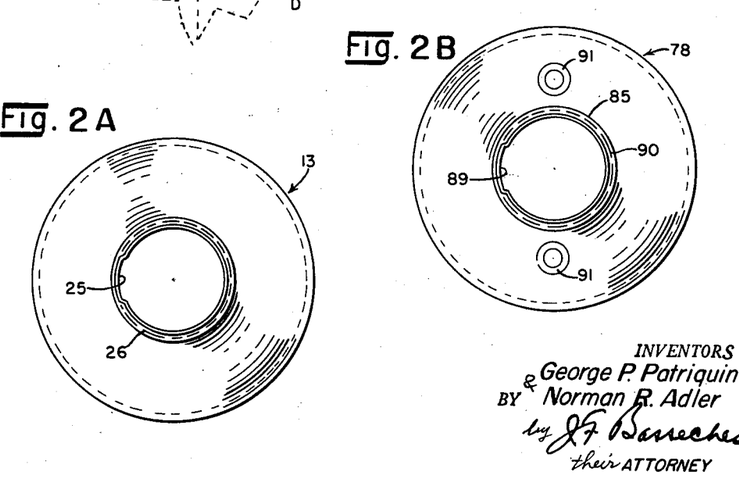
FIGURES 2a and 2b are face views of details.
Figure 2C:
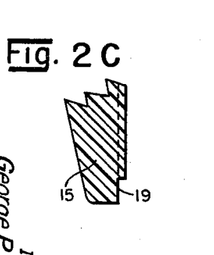
FIGURE 2c is a fragmentary sectional view of a detail.
Figure 3:
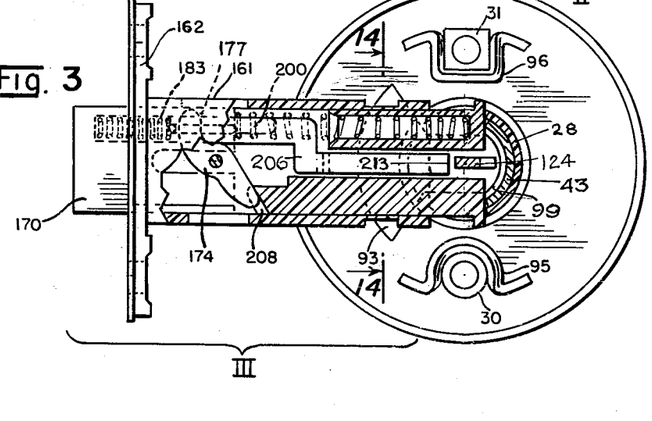
FIGURE 3 is a section on the line 3—3 of FIGURE 1, handed in the opposite direction therefrom, with portions in full lines.
Figure 4:
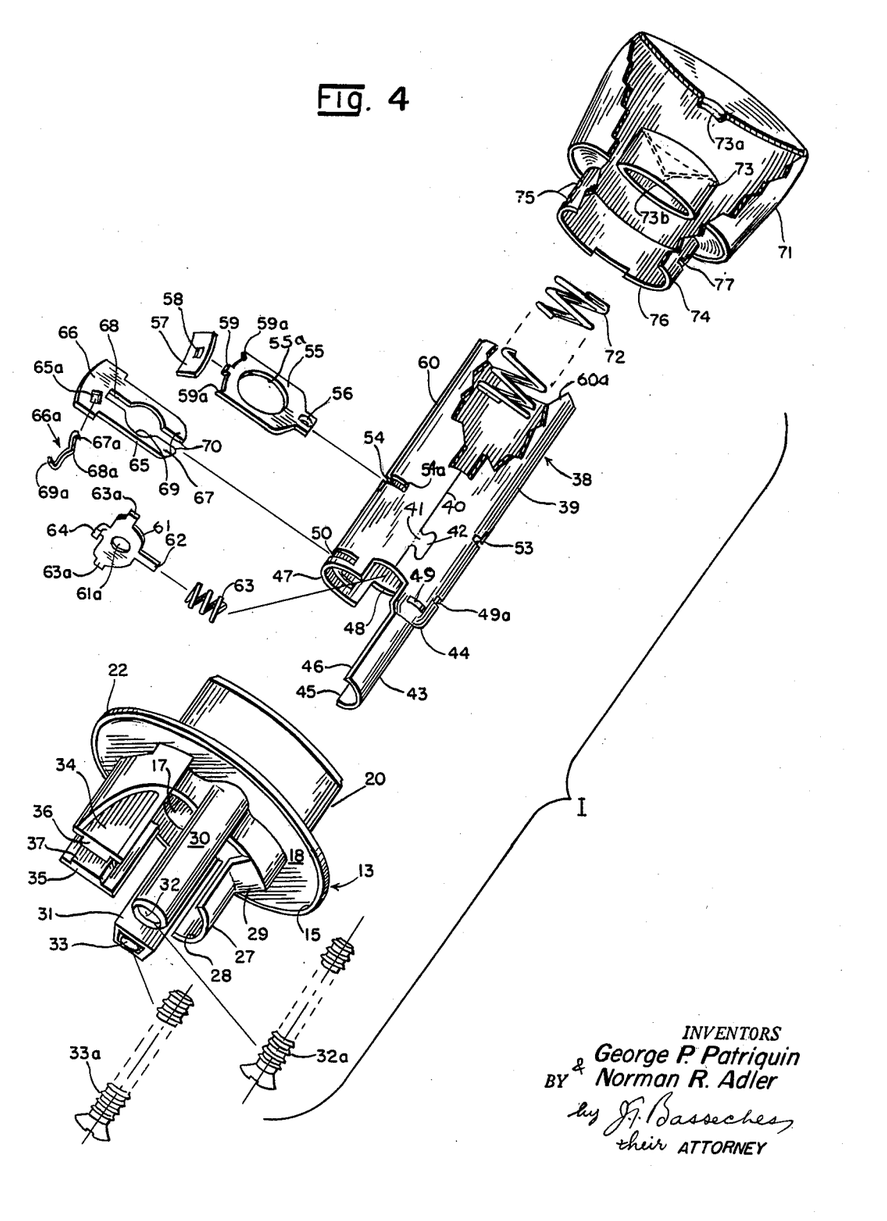
FIGURE 4 is an exploded perspective view of the outside knob assembly, with parts broken away for clarity.

The outside knob assembly I comprises an outside rosette 13, having a core 14 made of a plastic nylon, of which Zytel 101 is preferred, and made accurately by injection molding of the granular product, which is a polymeric amide resin or the resin formed by reacting adipic acid with hexamethylene diamine, as more fully described in the publication entitled "Zytel" Nylon Resin, copyright 1956 by E. I. du Pont de Nemours & Co. (Inc.), page 9, as follows:

AVERAGE VALUES OF PROPERTIES FOR MOLDED "ZYTEL" NYLON 101

*Properties, Units and ASTM Methods*

| | |
|---|---|
| Yield point, p.s.i., D638–52T: | |
|     −70° F. | 15,700 |
|     170° F. | 6,700 |
| Elongation, percent, D638–52T: | |
|     −70° F. | 18 |
|     170° F. | 320 |
| Modulus of elasticity, p.s.i., D790–49T: | |
|     73° F. | 420,000 |
| Shear strength, p.s.i., D732–46: | |
|     73° F. | 9,600 |
| Izod impact strength, ft. lb./in., D256–54T: | |
|     −40° F. | 0.4 |
|     73° F. | 1.0 |
| Compressive stress at 1% deformation, p.s.i., D695–54 | 4,900 |
| Hardness, Rockwell, D785–51 | R118 |
| Melting point, ° F., D789–53T | 520 |
| Coefficient of linear thermal expansion per ° F., D696–44 | $5.0 \times 10^{-5}$ |
| Water absorption, percent, D570–54T | 1.5 |
| Flammability, in./min., D635–44 | Self-extinguishing |
| Specific gravity, D792–50 | 1.14 |

It will be understood that the Zytel as prescribed is merely an exemplification of a material which may be employed in that it has excellent strength, stiffness, toughness, temperature resistance, low coefficient of friction, abrasive resistance (and dimensional stability) and that it can be injection molded into complex contours with great accuracy into final form without requiring any further finishing operations, and because of the unforeseen properties of simple assembly. Furthermore, dimentional alterations which this plastic product may undergo, by reason of thermal and humidity factors, may be balanced by combination with steel and brass, to retain close tolerances without experiencing overall distortion or weakening stresses and internal strains.

Still more important is the unforeseen self-restoration resiliency or "memory" which makes possible union of interfitting parts irreversibly, without requiring the normal equivalent of staking, riveting and like operations of metals, or the use of unusually expensive metals, as will appear more clearly as this description proceeds.

The rosette core 14, which is preferably selected and injection molded of Zytel 101, consists of a flange 15, to one side of which are radial webs 16, having a bearing 17, which bearing is formed with a keying spline or slot 17a. The door contact face 18 is finished to provide an annular thrust bearing face, as will appear as this description proceeds. Peripherally, a step-in groove 19 is formed to receive the outside rosette shell 20, made of spinnable metal, such as brass, or steel or aluminum having a bearing sleeve 21 extended from one side in an annulus 22 which receives the perimeter of the flange 15, after which the peripheral edge 23 may optionally be spun into an overhang 24 for engagement with the flange 15 to interfit the groove 19, to lie coterminously in the plane of the end thrust bearing face 18 previously described.

In closely combining the shell and case, dimensional balance is made for a wide range of changes in temperature and abnormal humidity ranges, to require no annealing or moisture curing before or after assembly of the shell and core.

The bearing sleeve 21 has a clearance section 25 of larger diameter, pressed outwardly in the axial plane of the shoulder 26, to permit assembly of the spindle sleeve, as will be more clearly described.

Axially and integrally extending from the inner face 18 is the parti-cylindrical annulus centering sleeve 27, from which extends the center bearing section 28, axially displaced by the stepped shoulder 29. The bearing face 28 is stepped-in from the bearing surface 17, as will appear more clearly hereinafter.

Diametrically spaced to each side of the sleeve 27 are draw studs 30 and 31 which terminate axially in threaded borings 32, 33, to receive tie bolts. Studs 30 and 31 are shaped for orienting (in respect of the spline or slot 17a) into coupling by making the former, 30, round, and making the latter, 31, square in outline, on their outer surfaces, respectively. Projecting to one side of the studs 30, 31 are latch casing studs 34, 35, each having fingers 36, 37, extended toward each other.

With the assembly of outside rosette as thus described, there is provided an outside spindle 38 made from sheet steel rolled into a cylindrically outlined portion 39 whose parting line meeting edges 40 are reinforcingly united by the dovetail tongue and groove slot, 41 and 42, respectively.

The spindle 38 terminates in a cam section 43 which is shaped in a parti-cylinder or half round of smaller radius than the cylinder of the spindle sleeve 39 by inwardly offsetting the same at the shoulder 44 to provide camming edges 45, 46, for the push type latch bolt, spaced from each other in an arc of about 105°. This cam section extends in a diametrically opposed position to the parti-cylindrical locking section 47 which overhangs the inwardly stepped edge 48, which is finished to provide a sliding bearing surface for the locking slide, as will appear.

To one side of the shoulder 44 and the extension 47 there are formed spaced slots 49, radially spaced from each other to each side of the axial line, and diametrically opposite thereto a single slot 50 is formed, to guide the outside sleeve retainer, as will appear hereinafter.

Rearwardly of the slot 50 there is a pressed-out band radially directed and forming an end thrust collar 51 constituting a portion of the cylinder and having an inwardly formed thrust bearing surface 52. Spaced outwardly from the collar 51 are diametrically positioned slots 53, 54 to receive a knob locking dog or detent 55. The detent 55 embodies some of the features of the detent shown, described and claimed in the patent to Muttart No. 2,842,389 of July 8, 1958. The detent in accordance with this construction has a clearance aperture 55a and has a latching tab 56, arranged to engage the slot 53, previously described, being held in this position by the detent spring 57 formed with a rectangular orifice 58 to fit on the lug 59 and press the detent outwardly through the slot 53.

The rearmost portion of the detent 55 to either side of the lug 59 has lugs 59a, 59a, which fit within the extension 54a, 54a of the slot 54, and are bisected by the axially directed slot 60, which not only facilitates location of the detent spring 57 but also provides a knob keying slot. The entrance portion of the slot 60 has the edges kerfed to facilitate finding the slot 60, as will be readily apparent. Transverse slots 60a, positioned diametrically to each other, and resiliently to the sleeve for a driving fit with the knob, to be described.

With the construction as described, assembly of the rosette 14 and spindle sleeve 38 is first effected by projecting the parti-cylinder, inwardly offset camming end 43 of the spindle into the bearing 17 until the collar 51 abuts the leading edge 16a of the core 14 and projects the camming portion 43 and extension 47 to one side of the bearing face 18. When so located, a locking slide 61 is positioned to have its dogging tongue 62 extend in the slot 49a rearwardly between slots 49, 49, first however sleeving a helper spring 63 thereover and positioning the extension lugs 63a, 63a to each side thereof, to ride upon the inwardly stepped spindle edge 48.

The locking or spindle dogging slide 61 has upstanding from the face thereof a lug 64, arranged to extend through the outside sleeve retainer plate 65, which latter may project through and into the pair of spaced slots 49 and the diametrically opposed slot 50 of the sleeve, to extend the upper end section 66 and the lower spaced sections 67, 67 by springing, into contact with respective slots through the cam section 43 and locking section 47 of the spindle sleeve and into outer thrust bearing contact with the face of the core 14 of the rosette. The sleeve retainer plate 65 also has a central slot 68 into which the lug 64 is diametrically guided by the helper spring. An offset rectangular cutout 65a is arranged to receive a sleeve retainer spring 66a which has a leading camming edge 67a, followed by a detent rib 68a and a stop tongue 69a, whereby to bias the retainer plate 65 in locking position within the slot 50 as it lies cross wise and longitudinally extended on the inside wall of the spindle sleeve.

A central, generally ovoid clearance slot 69 and spaced edges 70 are provided in the outside sleeve retainer plate 65, which are constructed to receive the lock bar in the dogging position, as will appear hereafter. Optionally, the outside knob assembly may be completed at this time by sleeving the knob 71 in position, first inserting the spring 72, to be seated upon the detent 55, capping the release button 73 thereover, and sliding the knob shank 74 to interfit the pressed out lugs 75 in the slot 69 while the leading edge 76 of the shank depresses the camming edge 56 of the detent, as will be understood from reference to the Muttart patent previously mentioned, until the detent slides into the keeper slot 77, which is of generally T-shaped construction and corresponds in position to the slot 53 on the spindle sleeve, previously described.

It will be understood that the use of the detent 55, with its latching feature in accordance with the aforesaid Muttart patent, need only be employed where it is found expedient to utilize the quick sleeve action, as otherwise a manually depressible detent may be employed.

The seating of the knob 71 into engagement completes the outside knob assembly.

(II)

Figure 5:
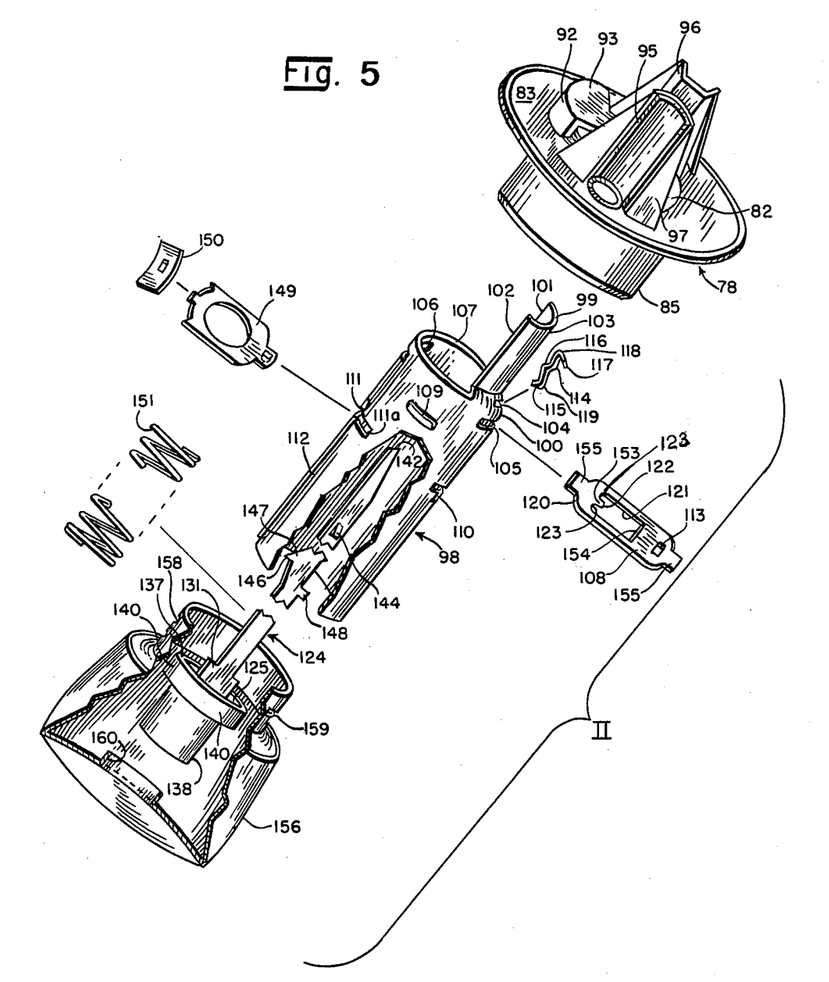
FIGURE 5 is an exploded perspective view of the inside knob assembly, with parts broken away to show detail.

The inside knob assembly II comprises an inside rosette 78 having a core or inside rose plate 79 made of Zytel #101, as in the case of the outside knob assembly I for the reasons there described. The core or inside rose plate 79 has a flange 80, to one side of which integrally extends a sleeve 81 formed with a bearing 82 axially thereof, to receive the inside knob spindle sleeve more particularly to be described.

The door contacting face 83 is finished as part of the molding process to provide a thrust bearing face, as previously described.

Peripherally, a step-in groove 84 is formed to receive the inside rosette shell 78, previously described, having a bearing sleeve 85 extended from one side into an annulus 86 which is arranged to receive the perimeter of the flange 80, after which the annulus 86 may optionally have its peripheral edge 87 spun into an overhang 88. Bearing sleeve 85 has a clearance section 89 pressed outwardly in the axial plane of the shoulder 90 to permit assembly of the spindle sleeve outward thrust bearing as described in connection with the outside rosette shell 20. Diametrically opposed counter-sunk collars 91, 91 are provided to receive the draw bolts or screws passing to the studs 30, 31, previously described.

Projecting from the bearing face 83 of the core 79 and integral therewith is the lock bar bracket 92, having a downwardly projecting finger 93 in parallelism with the face 84, a lock bar guide slot 94 being formed therein, as will appear as this description proceeds.

Diametrically to each side of the bearing aperture 82 are formed the open sided stud receiving channels 95, 96, stiffened by webs 97 to each side thereof. Channel 95 is cylindrical in outline to conform to the stud 30. Channel 96 is rectangular in outline, to receive the stud 31, previously described. It will thus be seen that the coupling of the studs 30, 31 with the channels 95, 96 into inter-engaging fit can be effected only in one position.

With the assembly of the inside rosette as thus described, there is provided an inside spindle sleeve 98 which terminates in a cam 99 which is a part of a cylinder of smaller radius than the radius of the spindle sleeve 98 by offsetting the same at the shoulder 100 to provide camming edges 101, 102, spaced from each other in an arc of about 105°, the outside bearing surface 103 being calculated to nest concentrically within the cam 43, previously described.

On the shoulder 100, centrally thereof, there is provided a locating slot 104 adjacent the diametrically positioned slots 105, 106, which locking slots are spaced from the inside edge 107 for the distance which the bracket 93 is spaced from the core 79, with due clearance to receive the inside sleeve retainer 108, the assembly of which will be presently described. The spindle 98 is otherwise formed rearwardly thereof with a pressed out, radially directed inward thrust collar 109. Spaced from the collar there is cut out the generally T-shaped slot 110 of the same nature as the slot 53 previously described, and cross slots 111 having sections 111a, 111a, corresponding to the sections 54a, 54a previously described, all merging into the axially directed channel 112 corresponding to the slot 60, previously described. As in the description of the outside knob, additional slots toward the tail of the spindle sleeve may be provided to add resiliency in sleeving the shank of the knob to be described.

With the sleeve thus provided, the second assembly is effected by sleeving the spindle with the camming end 99 into the bearing 82 until the end thrust collar 109 engages the sleeve 81. In this position, the inside sleeve retainer 108 is projected through the slots 105 and 106 until the retainer spring aperture 113 is aligned with the retainer aperture 104 of the spindle sleeve 98. In this position, the sleeve retainer spring 114 is projected through the rectangular aperture 113.

The sleeve retainer spring 114, as previously described in connection with the retainer spring 66a, has a leading camming edge 115, a detent rib 116 and a stop tongue 117 whereby to bias the inside sleeve retainer 108 in the locking position with the slots 104 and 105 as the contact points 118 and 119 spring bias the retainer 108 so that the shoulders 120 engage the inside wall of the spindle sleeve 98 to each side of the retainer plate 108.

The inside sleeve retaining plate, centrally thereof, has a generally oblong cutout 121. Centrally of this aperture there is a depending lug 122, which extends beyond the clearance shoulders 123. The aperture 121 is designed to receive the locking bar 124.

The locking bar 124 is first assembled with the push button insert 125. The push button insert 125 is made of the nylon class of plastics, and preferably Zytel #101. It is molded to provide an annulus 126 and a central sleeve 127 through which extends an oblong aperture 128, the leading edges of which are kerfed at 129. With the button so provided, lock bar 124 is assembled with the push button insert. For this purpose it is to be observed that the lock bar 124 terminates in a shank 130 to one side of opposed lugs 131, which extend from each other to span the widest dimension of the aperture 128. The shank 130 is designed to provide a tight fit within the aperture 128 and has along its length a barb 132, stamped out from the shank 130, to provide a camming leading edge 133 and an irreversible locking edge 134 at the trailing portion. The locking bar may be made of steel.

With the locking bar thus provided, the shank 130 is forced into the locking button aperture 128 so that the flat portion 135 first enters the kerfed edges 129 thereof. With a driving fit action, the shank 130 is forced within the aperture 128 of the sleeve 127 until the locking edge 134 passes the edge 136. The inherent resiliency and self-shape restoring property of the Zytel permits assembly as thus described without rupturing the push button insert 125, the action being aided by the camming edges 129 previously described.

The location of the barb 132 with relation to the studs 131 is to bring the studs 131 into engagement with the face 137 of the button and hold the button firmly. Thereupon the insert is capped with the push button sleeve 138 which has a guide portion 139 and a flange 140, which may be spun over the flange 126 of the push button, to overlap the same upon the face 137.

The general over-all dimension of the lock bar 124 is to make a sliding fit with the lock bar guide slot 94, which latter slot is axially off center to permit tilting movement adjacent the terminal 141 for a distance which will hereafter appear.

The locking bar 124 has its nose 142 formed with a camming edge and an angular clearance section 143. Along the locking bar, a locking barb 144 is pressed out from the side walls of the sheet forming the same, to provide a locking edge 145 in opposed direction to the nose 142. Rearwardly of the barb 144, the bar is provided with the latch 146 to one side of the camming edge 147. The latch 146 is offset within the limits of the downward projection of the lug 122 in the inside sleeve retainer. Rearwardly of the latch 146, the lock bar is formed with a downwardly depending stop lug 148.

With the construction thus described, the inside knob assembly may be completed. This is effected by positioning a detent 149, of a construction similar to the detent 55 or a variant thereof, as described, in the diametrical slots 110 and 111, employing a retaining spring 150, similar to the spring 57, to locate the same. Thereupon a push button spring 151 is seated against the detent 149 and the lock bar assembly 124 is thrust therethrough to project the same through the slot 94 until the barb 144 is forced past the bracket 93, biasing the spring 151 against the push button insert face 137. No clearance machining is necessary where, in accordance with the preferred embodiment, the material of the bracket 93 is made of Zytel or like self-restorable plastic to secure economy of assembly between the metal and the Zytel, which is one of the features of this invention. Reverse movement is restrained by reason of the barb 144 and the close sliding fit which the lock bar 124 makes within the slot 94, limiting the same to tilting movement along the eccentric clearance previously described and locking the same against rotation with respect to the inside rose plate 79.

The flange 140 of the push button 138 will ride freely within the spindle 98 and, within limits, permits tilting movement of the latitude provided by the eccentricity of the slot 94 with relation to the edge 152 of the lock bar blade, and will stop in its upward movement against the edge 153 of the lug 122 of the inside sleeve retainer, and in the downward position will stop on contact with the bottom edge 154 of the inside sleeve retainer 108. Thus the inward movement of the push button 138 will cause the lock bar 124 to move to ride the camming edge 147 against the edge 153 just described until the latching edge 146 engages the inner side of the lug 122, to hold the lock bar in the depressed position until kicked from engagement with the lug 122 into the clearance slots 123, 123 to either side thereof.

It will be seen that the extensions 155 and 155 of the inside sleeve retainer 108 provide contacting faces with the inside rose plate 79, to provide a thrust bearing in which the metallic inside sleeve retainer 108 is surface lubricated by the inherent characteristics of the rose plate 79, where plastic is used, and preferably in the form of Zytel.

Finally, the inside knob 156 is sleeved into position by guiding the shank 157 with its guiding lugs 158 along the slot 112 of the inside sleeve 98, to latch the keeper slot 159 with the detent 149 projecting through the aperture 110.

The push button 138 will be guided in the aperture 160 to and from the depressed condition, as will be readily understood.

(III)

Figures 6, 7:
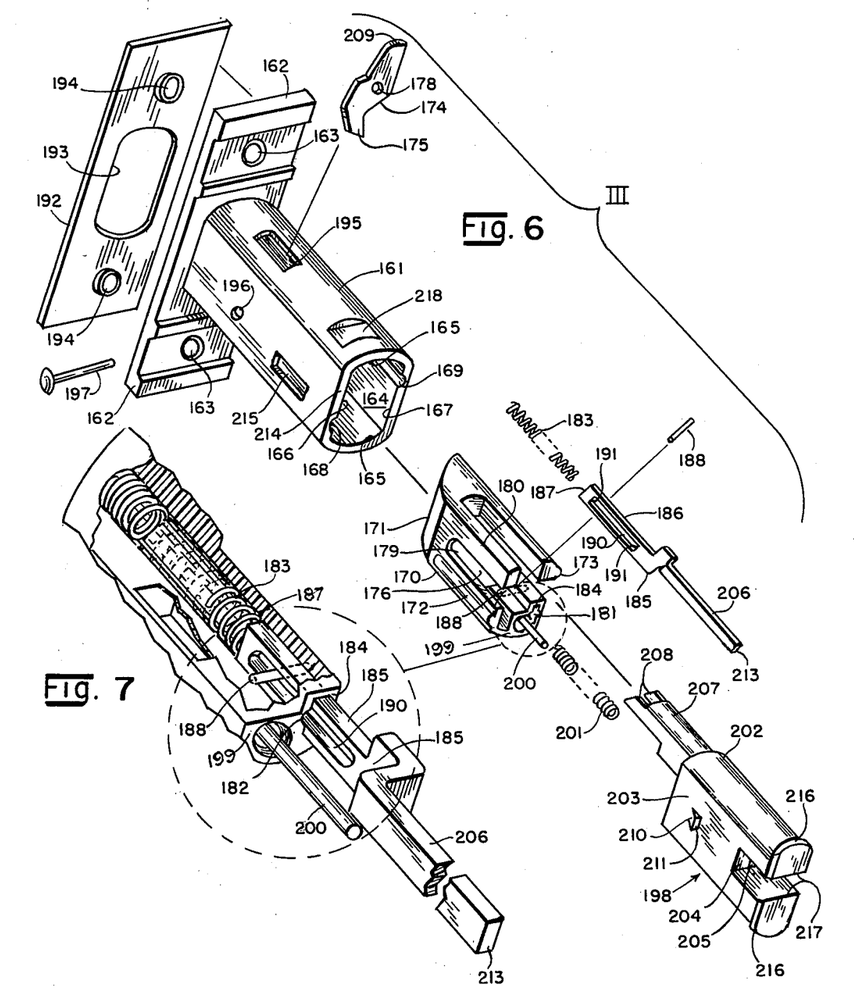
FIGURE 6 is an exploded perspective view of the latch bolt assembly.
FIGURE 7 is a magnified section of an isolated detail of a part shown in FIGURE 6, with portions in section to show detail.
Figure 8:
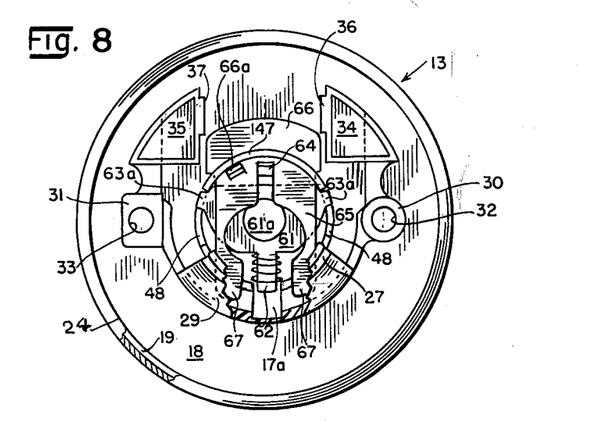
FIGURE 8 is an end elevation taken in the direction of the arrows 8—8 in FIGURE 2, with portions in section to show detail.
Figure 9:
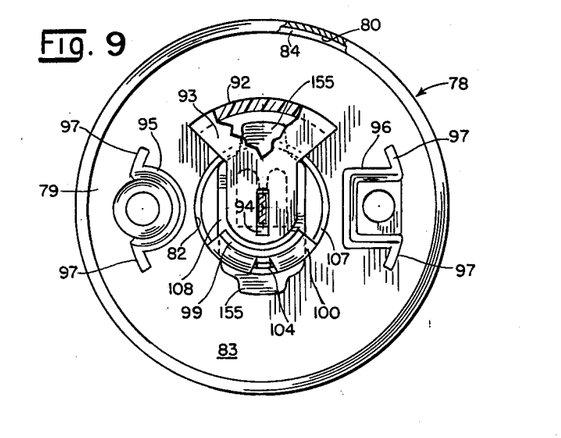
FIGURE 9 is an end elevation taken in the direction of the arrows 9—9 in FIGURE 2, with portions in section to show detail.
Figure 10:
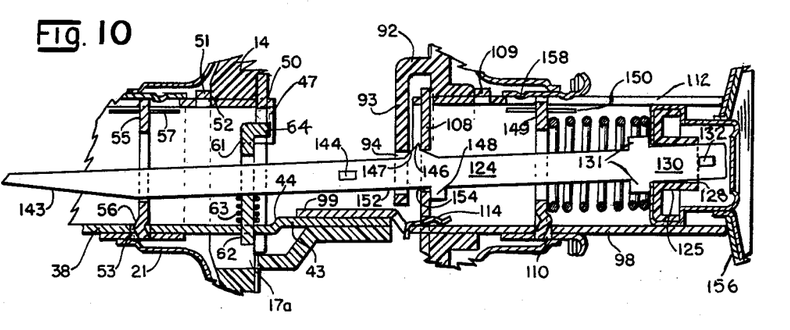
FIGURE 10 is a fragmentary sectional view corresponding to portions of FIGURE 2, with the locking bar moved to the dogging position, parts being omitted for clarity.
Figure 11:
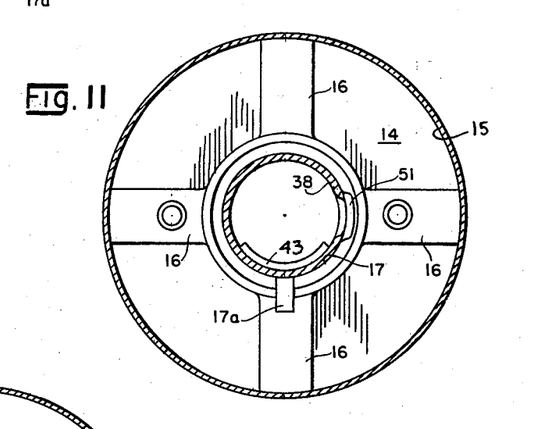
FIGURE 11 is a fragmentary, staggered section taken on the line 11—11 of FIGURE 2.
Figure 12:
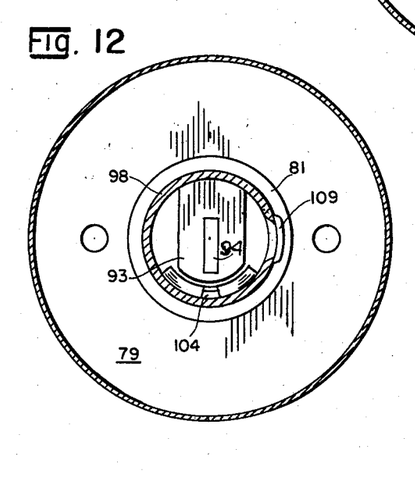
FIGURE 12 is a fragmentary, staggered section taken on the line 12—12 of FIGURE 2.
Figure 13:
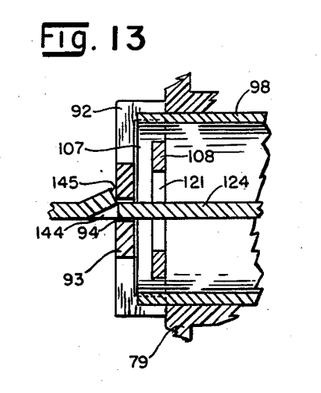
FIGURE 13 is a fragmentary section taken on the line 13—13 of FIGURE 2.
Figure 14:
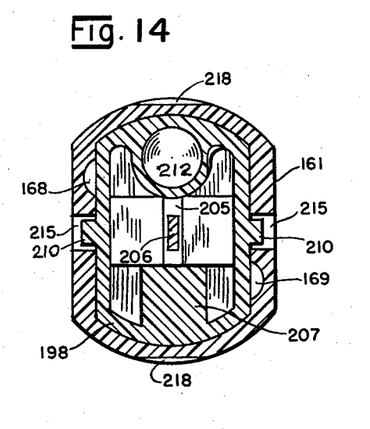
FIGURE 14 is a fragmentary section taken on the line 14—14 of FIGURE 3.
Figure 15:
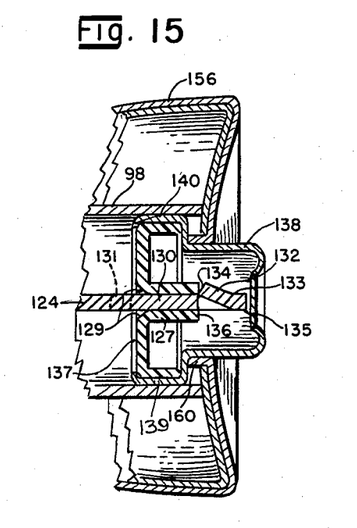
FIGURE 15 is a fragmentary section taken on the line 15—15 of FIGURE 2.

The latch case assembly consists of a latch case 161, preferably molded of Zytel #101, having adjacent the front end upstanding face plate supporting wings 162 to either side thereof, formed with apertures 163. Axially, the casing 161 has a boring 164 of generally rectangular outline, with the upper and lower edges 165 arcuately formed and with the side edges 166 and 167 flat and in parallelism and longitudinally formed with asymmetrical grooves 168 and 169.

Into the boring 164 there is slidably positioned the latch 170. This is a relatively thin walled shell, molded, preferably from Zytel, and having a leading camming nose 171. The shank of the latch is longitudinally formed with guide and stop lugs 172, 173, which are asymmetrically extended from each other complementary to the grooves 168, 169 of the latch case. Rotation at 180° will serve to reverse the "hand" of the latch bolt.

Internally, the latch case is arranged to receive the bell crank lever 174 to have the head 175 thereof project into the slot 176 of the latch to engage the wall 177. The intermediate point of the bell crank lever 174, depending on the desired multiplication of motion, is formed with an aperture 178, to align with the longitudinal guide slots 179 formed in the side walls 180 of the latch bolt. Additionally, the latch 170 has a kickoff bar guide slot 181, including a parti-circular portion 182 to receive the sequence kickoff bar spring 183 and rectangular side walls 184 into which may be extended the kickoff bar 185, to have its forward branch 186 guided along the rectangular section of the wall 184, after inserting the sequence spring 183 to bias the same against the head 187 of the kickoff bar.

A retaining pin 188 is passed through the retainer pin aperture 189 and into the kickoff bar guide slot 190, to retain the guide bar slidable within the limits of the end walls 191 and slot 190.

Optionally, assembly may be made with the face plate 192 which has a latch bolt aperture 193 to receive the nose 171 but to block the lugs 172, 173. The face plate 192 may be made of steel or brass and has spun therefrom eyelet forming sleeves 194, complementary in position to the apertures 163 of the wings 162. After force fitting the eyelets within the apertures 163, the interior edges are riveted into binding position. The bell crank lever 174 is then inserted through the latch case via the slot 195 and the slot 176 to the point where the bearing apertures 178 is aligned with the slot 179 and the bell crank rivet aperture 196, formed in the latch case. When the position is achieved, the bell crank lever rivet pin 197 is extended through the aperture 196 and the aperture 179, fixedly to hold the bell crank lever 174 in tilting position, after which the rivet 197 is staked or headed on the remote end.

With the latch 170 in position and carrying the lock bar and bell crank lever 174, the members are capped resiliently in relation to each other and to the latch case 161 by affixing the shoe 198. The trailing end 199 of the latch 170 has a spring centering stud 200, over which is sleeved the latch spring 201. The shoe 198 is likewise a shell molded out of Zytel or like plastic and has upper and lower walls 202, generally arcuately formed to fit the latch case edges 165, and flat side walls 203 to fit the side walls 166, 167 and hold the shoe against rotary movement but permitting sliding contact with a nice sliding fit.

The shoe 198 is generally tubular, relatively resiliently to space the side walls 203 from each other, and includes a bottom wall 204 having a guide slot 205 for the trailing edge 206 of the kickoff bar 185, previously described, and into which slot 205 the kickoff bar is guided. Forwardly, the shoe is formed with a finger 207, having a bifurcated section 208 arranged to abut the section 209 of the bell crank lever as it enters the latch case.

In the medial trailing position of the shoe 198, it is formed with symmetrical camming latches 210, extended from the side walls 203, having the abutment edges 211 in the trailing position.

Having located the latch spring 201 upon the latch spring guide 200, the shoe 198 is nested within the latch case 161 so that the latch spring 201 enters the latch spring housing 212. The lock bar 206 is guided in the slot 205, to extend its tail 213 therefrom until the latches 210 engage the edge 214 of the latch case 161. Each of the walls of the latch case 161 is formed with a slot 215 so that after forcing the latches 210 past the edge 214, they enter into the slots 215 in the side walls of the latch case. The resiliency of the walls of the shoe 198 and the latch case 161 permits snap action assembly of the shoe and casing, fixedly to hold the shoe in position despite the close sliding fit of the shoe and casing.

It will be observed that as the shoe 198 is moved inwardly within the casing, it pivots the bell crank lever 174 to retract the latch bolt 170 and that the latch bolt 170 may be independently depressed against the sequence spring 183, and then against the latch spring 201, and during this sequence of movement, the latch bolt projects the kickoff bar 185 relatively to the shoe 198. The inward limiting movement of the shoe 198 in the latch casing 161 is controlled by the end flanges 216. The shoe end likewise is formed with bifurcations 217 to each side of the slot 205, to span the lock bar, as will appear from the assembly on the door frame which will be hereafter described.

ASSEMBLY

Assembly of the components I, II, III just described with the door D is effected very simply and quickly after preparing the door with the drill holes 10 and 11 as described, by first projecting the assembly III comprising the latch bolt casing into the drill holes 10 until the end plate 192 fits within the usual mortice, which position will project the latch bolt casing 161, with its shoe 198, to be accessible from opposite sides of the transverse drill hole 11. The usual end plate screws may then be affixed through the rivet holes and driven home to hold the casing 161 against displacement.

Optionally, it may be desirable to complete the fastening operation after the inside and outside knob assemblies have been attached. For this purpose, outside knob assembly I and inside knob assembly II are aligned to the outside and inside faces of the door, respectively, preferably first applying the outside assembly so that the studs 34, 35 span the latch bolt casing and enter the opposed kerfs 218 on the upper and lower edges of the latch casing 161 which is adjacent the tail end thereof and is accessible adjacent the side walls of the bore 11. Preferably, the kerfs 218 are dove-tailed in shape, with the narrowest dimensions contiguous, serving not only to guide the lugs 37 into engagement with the kerfs but permitting an askew position of the axes of the latch bolt casing and knob assemblies for adaptation to an angular relationship of the door edge to its front and rear faces, or to compensate for any misalignment in the drill holes 10 and 11.

Thereupon the inside knob assembly II is applied to the drill hole 11, directing first the lock bar 124 into the outside sleeve retainer aperture 69, then guiding the nose 142 into the locking slide 61 in the generally ovoid aperture 61a, through the central aperture of the detent 55 of the outside knob assembly I, and then in the center of the coil 72 holding the release button 73 and covering the emergency aperture 73a. Final seating may be effected only when proper orientation of the inside knob assembly has been correctly made to align the studs 30 and 31, respectively of circular and rectangular outline, extending from the outside rosette core 14, previously described, with the corresponding channels 95 and 96, respectively.

In the home position, screw bolts 32a and 33a may be threaded into the screw holes 32 and 33, to draw the rosettes to each other, as will be readily understood.

For operation, the cams 43 and 99 of the outside and inside sleeves, respectively, are nested adjustably longitudinally with relation to each other to accommodate themselves to placement of the inside and outside assemblies to the thickness of the door within a reasonable variant, without experiencing any loss of alignment as they are supported against stress, in a measure, by the center bearing 28 in relation to which the cams 43 and 99 oscillate, and press against the shoe 198 to move the shoe against the bell crank lever section 209 and, in turn, retract the latch bolt 171 as the opposite finger 175 engages the tail of the latch 171 in the slot 176. Right or left hand operation may be effected, as will be readily understood, by the clockwise or counter-clockwise rotation of each of the knob spindles, as relatively small angular displacement of each of the knobs effects a full withdrawal of the latch bolt 171.

To dog the outside knob 71, the lock bar 124 is actuated by pushing the push button 138. This movement places the camming face 147 into engagement with the dependent lug 122 of the inside sleeve retainer 108 and tilts the lock bar until the latching shoulder 146 engages the lug 122 and holds the lock bar in the depressed position on the outer face of the lug 122. Tilting is possible by reason of the eccentric portion 94 of the slot adjacent the edge of the bracket 93 and limiting movement is effected with the lug 148 abutting the inside face of the inside sleeve retainer 108.

In the outside knob assembly, the tilting movement of the lock bar is permitted by movement from the ovoid aperture 69 downwardly between the bifurcations 67, 67 along the walls 70, 70. This tilting movement is against the biasing influence of the locking slide 61 normally held upwardly by the helper spring 63 along the locking finger 62. As the locking slide is tilted downwardly, locking finger 62 enters the slot 17a formed in the outside rosette plate 14. This action dogs the outside spindle sleeve 38. This action will be recognized as desirable for a bathroom lock construction or like communicating door arrangement.

Upon rotation of the inside knob 156, rotating the inside spindle 98 and its assembly, the plate 108 carried thereby is tiltably moved so that the lug 122 is radially displaced to either side of the lock bar 124 and specifically moving the lock plate 108 so that either lobe 123 is in the relatively vertical position, releasing the tooth 146 from engagement with the lug 122 under the biasing influence of the spring 151 and the helper spring 63, previously described. This condition re-establishes the rotatability of the outside knob assembly.

Should an emergency exist where someone accidentally leaves the push button 138 in the depressed position, the locked condition of the outside knob may be relieved by passing a spike or pin through the emergency aperture 73a formed in the outside knob, to reach the release button 73, pressing the same against the biasing influence of the spring 72 until the interior cone 73b engages the nose 142 of the lock bar 124. This serves to tilt the lock bar free from engagement of the tooth 146 and the lug 122 just described, to free the outside knob for rotation.

THE KICKOFF FEATURE

Another feature to preclude accidental shut out, should the push button 138 have been pressed into locking position when the door is open, by accident or unknowingly as by a child, to set the locking bar 124 in position where it dogs the outside knob, there is provided a kickoff feature to restore the locking bar 124 to its neutral position. It will be observed that when the locking bar 124 is depressed, it tilts into the eccentric portion 94 of the slot in the bracket 93, thereby locating the locking bar adjacent the tail 213 of the kickoff bar. Should the door slam closed as it strikes the latch 171, it directs the tail 213 into engagement with the lock bar 124, to tilt the same and disengage the latch edge 146 from the lug 122 in the initial depression, thereby to permit the spring 151 to withdraw the locking bar and, in turn, the helper spring 63 to move the locking slide to withdraw the locking finger from the spline 17a.

It will be understood that while there has been described and illustrated as desirable in a communication lock, such as a bathroom lock, the inclusion of the push button means or turnbutton means on the inside knob, for dogging the outside knob against latch operation, including the kickoff feature hereinabove described, it will be understood that such features may be omitted where lock out means are not deemed necessary, in which event the inside and outside knobs are replaced as well by imperforate knobs, as the push button means on the inside and emergency means on the outside knobs are also unnecessary.

Accordingly, the measure of the invention contemplates as novel the utilization of less than the preferred complete combination and is to be construed within the scope of the appended claims.

It will also be observed that while in instances there has been outlined the preferred nylon plastic composition Zytel #101 as forming the material of which components of the structure may be made to achieve the desirable features outlined, particularly with respect to its value in assembly with relatively rigid members, such as those made of steel, to pass the same through guide slots in prefabricated condition, irreversibly to assemble the same by reason of its self-shape restoring characteristics or "memory," it will be understood that it is not intended to be limited to this material, since the disclosure of the properties useful in the relationship which has been outlined will suggest to those skilled in the art how to select or alter other materials, in a measure to achieve the same or similar utility.

We suggest the acrylic resins under the Du Pont trademark Lucite, supplied in granular form, for injection molding; the tetrafluoroethylene resin under the Du Pont trademark Teflon for sinter molding; as well as the high melting, highly crystalline thermoplastic polymerized acetal resin under the Du Pont trademark Delrin, which latter is available for extrusion operations, all as illustrative of materials which may, in a measure, serve to provide some of the desirable properties of the preferred material, Zytel #101.

Having thus described the invention and illustrated its use, what is claimed as new and is desired to be secured by Letters Patent is:

1. In a cylindrical door lock assembly, the combination having an outside rosette shell, an inside rosette shell, each having a spindle bearing sleeve extending axially longitudinally thereof, and a rosette core of plastic filling each of said shells, an auxiliary bearing in each rosette core and a spindle sleeve in each of said bearings, said spindle sleeves having integrally formed retractor cams at their inner terminal ends, said rosette cores being formed with end thrust bearing faces, and transverse, radially slidable spindle sleeve retainer plates removably seated on said spindle sleeves having extensions to one side thereof, the latter making end thrust engagement with said end thrust bearing faces of said cores.

2. In a cylindrical door lock assembly, the combination having an outside and an inside rosette comprising metallic shells, each having a spindle bearing sleeve and an annulus, a rose plate core of plastic nylon supported in each said annulus, each core having an axial bearing and an inner face and an outer face end thrust bearing maintained in substantially constant clearance value by said shells, a knob spindle sleeve supported in each axial bearing, collar means on said spindles engaging said outer face end thrust bearing of said cores and endwisely transversely slidable retainer plates on said spindles making end thrust contact with said inner face end thrust bearings of said rosette cores.

3. In a cylindrical door lock assembly, an outside and an inside metallic rosette shell having an annulus, a rose plate core of plastic supported and enveloped in each said annulus, each core having an axial bearing and an inner and an outer end thrust bearing maintained in substantially constant clearance value by said shell, a knob spindle sleeve supported in each of said axial bearings having integrally formed thereon parti-cylindrical cam sections in overlapping relation, an integral, parti-cylindrical annular centering sleeve extending from one of said cores, overlapping and forming a center bearing for said overlapping sections.

4. In a cylindrical door lock assembly, an inside and an outside rosette comprising metallic shells, a rose plate core of nylon supported in each said shell, each core having an axial bearing and an outer thrust bearing maintained to have a substantially constant clearance factor by the shell therefor, a knob spindle sleeve supported in each of said axial bearings, each said knob spindle sleeve comprising a cylinder terminating in a parti-cylindrical cam in overlapping, adjustable position and an integral center bearing extending from one of said cores in overlapping relation to said cams.

5. In a cylindrical door lock assembly, an outside and an inside rosette, each comprising a metallic shell having a rose plate core of nylon tape plastic supported therein, the shells being each open ended and exposing on one face an end thrust bearing, a knob spindle sleeve supported in each of said rosettes, each knob spindle sleeve having diametrically formed supporting slots, and a radially slidable spindle sleeve retainer extending through said supporting slots having extension portions engaging said end thrust bearing whereby assembly to hold said spindle in end thrust bearing contact is effected by said extension portions in engagement with the end thrust bearing.

6. In a cylindrical door lock assembly, an outside and an inside rosette, each comprising a metallic shell having a rose plate core of nylon type plastic supported therein, the shells each being open ended and exposing on one face an end thrust bearing, a knob spindle sleeve supported in each of said rosettes, each knob spindle sleeve having diametrically formed supporting slots, and a radially slidable spindle sleeve retainer plate extending through said supporting slots having extension portions engaging said end thrust bearing, each of said spindle sleeve retainer plates having spring biasing means transversely slidable in relation to said plates holding said retainer plates in position whereby assembly to hold said spindle in end thrust bearing contact is effected by said portions in engagement with the end thrust bearing.

7. In a cylindrical door lock assembly, an outside and an inside rosette, each comprising a metallic shell having a rose plate core of nylon type plastic supported therein, the shells each being open ended and exposing on one face an end thrust bearing, a knob spindle sleeve supported in each of said rosettes, each said knob spindle sleeve having diametrically formed supporting slots, and a radially slidable spindle sleeve retainer extending through said supporting slots having extension portions engaging said end thrust bearing, a knob-control lock bar extending from one knob spindle sleeve to the other, said cores having integral, interconnecting coupling means comprising a pair of studs on one core and a pair of sleeves on the other core, one of each of the said pairs of studs and pairs of sleeves being dissimilar in cross section to provide orienting means to hold said cores in only one predetermined relation to the other axially with respect to said lock bar, one of said cores having a lock bar bracket integrally formed with said core.

8. In a cylindrical door lock assembly, an outside and an inside rosette, each rosette comprising a metallic shell having a rose plate core of nylon type plastic supported therein, exposing on one face an end thrust bearing, a knob spindle sleeve supported in each of said rosettes, each knob spindle sleeve having diametrically formed supports in said sleeves, and radially slidable sleeve retainers extending through said supports engaging said end thrust bearings of said cores, a knob control lock bar extending from one knob spindle sleeve to the other, said cores having integral, interconnecting coupling means comprising a pair of studs on one core and a pair of sleeves on the other core, one of each of the said pairs of studs and pairs of sleeves being dissimilar in cross section to provide orienting means, whereby axial coupling of said studs and sleeves may be effected in only one position, one of said cores having a lock bar bracket integrally formed with said core.

9. In a cylindrical door lock assembly, outside and inside rosette assemblies, each rosette assembly comprising a metallic shell having a rose plate core of plastic, the peripheral edge of each of which shells forms an annulus to encase said core, the cores each having an axial bearing and a face thrust bearing, knob spindle sleeves supported rotatably in said axial bearings and sleeve retainers comprising end plates, endwisely slidable, bisecting said knob spindle sleeves, having extensions to each side of said sleeves contacting in end thrust engagement with said cores, one of said end plates being bifurcated and sprung into engagement with said knob spindle sleeves.

10. In a cylindrical lock assembly, the combination having inside and outside rosette assemblies, each rosette assembly comprising a metallic shell having an annular flange, a rose plate core of nylon supported by each of said annular flanges, each core having an axial bearing arranged axially and pivotally to support a knob spindle sleeve in said bearing, said core of said inside rosette assembly having an integrally connected, radially dependent bracket having a guide slot, a longitudinally slidable and tiltable locking bar carried by the inside knob terminating in a push button on said inside knob and having its opposite end extending within the bore of the outside spindle sleeve, said bar being tiltably guided within said guide slot of said bracket guiding said bar against rotary movement, a radial spline in said outside rose plate core and a locking slide actuated by the tilting of said bar extending through said outside spindle sleeve into said spline, whereby selective locking of said outside spindle sleeve with said outside core by said push button is effected.

11. In a cylindrical door knob assembly having an inside and an outside rosette assembly, each assembly having an axial bearing, and a knob having a spindle sleeve rotatably mounted in each bearing including a parti-cylindrical cam, said cams being axially aligned and nested in overlapping position to each other, concentric with relation to each other and extensibly contacted in relation to each other for door thickness adjustment of the inside and the outside rosette assemblies, the combination wherein one of said assemblies has a rosette core of plastic, and said latter core has an integral bearing sleeve in which said cams are concentrically mounted for axially, reinforcingly supporting both said sleeves and cams in relation to each other in said axial alignment.

12. In a cylindrical lock assembly having inside knob and outside knob rosette assemblies including spindle means supported thereon and means on the inside knob for locking the outside knob against rotation, the combination therewith of means comprising a locking bar supported in said spindle means, spring biasing means to direct said bar in one direction, a bracket of plastic nylon integrally extended from said inside knob rosette assembly, having slotted means in which said locking bar is guided holding said locking bar against rotation, and latching barb means having a leading camming face pressed out to one side of said locking bar, and lying to the side of said slotted means remote from said inside knob, said slotted means on said bracket irreversibly holding said locking bar guided in said bracket in the opposed direction.

13. A cylindrical door lock assembly comprising an outside knob assembly, an inside knob assembly, a latch bolt assembly, each knob assembly having a knob spindle for operating said latch bolt assembly, inner and outer sheet metal rosette shells for said inner and outer knob assemblies comprising a knob and knob shank including a knob spindle bearing sleeve extending axially longitudinally of said knob shanks, characterized by each of said shells including encased therein a rosette plate core molded from the molding type resin nylon, having tough abrasion and temperature resistant properties, with good dimensional stability, resiliency and plastic memory within said shells, each of said cores being provided with an axial bearing for each said knob spindle, said shells each including an annular flange, said plastic cores being supported in said flanges peripherally, said cores also having an end thrust bearing on their faces for engagement by end thrust bearing means on said knob spindle, each of said spindles including a transverse spindle retainer plate removable radially and slidably seated on said spindle arranged to make end thrust bearing engagement with said cores.

References Cited in the file of this patent
UNITED STATES PATENTS

| | | |
|---|---|---|
| 2,246,086 | Austin | June 17, 1941 |
| 2,611,635 | Cerf | Sept. 23, 1952 |
| 2,646,301 | Cerf | July 21, 1953 |
| 2,676,051 | Hillgren | Apr. 20, 1954 |
| 2,741,502 | Crandell | Apr. 10, 1956 |
| 2,756,495 | Lathrop | July 31, 1956 |
| 2,803,958 | Gilbert | Aug. 27, 1957 |
| 2,804,181 | Haynes | Aug. 27, 1957 |